UNITED STATES PATENT OFFICE 2,671,785

BROWN TRIAZINE VAT DYES

William Baptist Hardy, Bound Brook, and Asa Willard Joyce, Plainfield, N. J., assignors to American Cyanamid Company, New York, N. Y., a corporation of Maine No Drawing. Application June 27, 1952,
Serial No. 296,072

10 Claims. (Cl. 260—249)

This invention relates to new vat dyestuffs of the anthraquinone series derived from halogenated 1,3,5-triazines and, more specifically, to new brown vat dyes of the general formula:

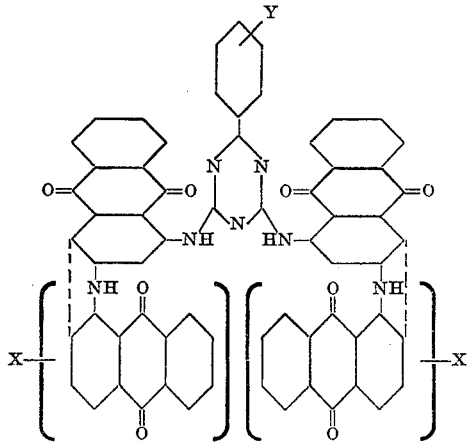

in which Y is a radical containing not more than two carbon atoms selected from the group consisting of alkoxy and alkyl radicals, X is an alpha benzoyl amino radical, and the dotted line may be a carbon-carbon bond.

The class of new vat dyestuffs containing the phenyl symmetrical triazine nucleus which has been developed in recent years has proved to be a source of very fast dyestuffs of outstanding properties, and some of these dyes have appeared as articles of commerce. The shades obtainable in this class have previously been limited to yellow, orange, and red dyestuffs. Attempts to prepare dyestuffs of other shades which possess the greatly desired dyeing properties of the triazine class of vat dyes were, prior to the present work, unsuccessful.

It is an advantage of our new series of dyestuffs that they all contain the 1,3-anthrimide linkage and have improved substantivity to textile fibers over the corresponding 1,4-anthrimide dyestuffs. The corresponding 1,4-anthrimide dyestuffs are disclosed and claimed in our copending application Serial No. 296,094, filed June 27, 1952.

We have now found that when 2-phenyl-4,6-dichloro-1,3,5-triazines are condensed with 1-amino-3-chloro or bromoanthraquinone and the resultant products are further condensed with an alpha-benzoylamino-alpha-aminoanthraquinone, with the elimination of the chlorine or bromine atoms, the products are brown dyestuffs of good shade and excellent dyeing properties, especially fastness.

Among the phenyl dichlortriazines which can be used to prepare the starting material in this invention are 2-phenyl-4,6-dichlor-s-triazine, 2-o - methoxyphenyl - 4,6 - dichlor-s-triazine, 2-o-methylphenyl-4,6-dichlor-s-triazine, 2-o-ethoxyphenyl - 4,6-dichlor-s-triazine, 2-o-ethylphenyl-4,6 - dichlor-s-triazine, 2-p-methoxyphenyl-4,6-dichlor-s-triazine, 2-p-methylphenyl-4,6-dichlor-s - triazine, 2 - p-ethoxyphenyl-4,6-dichlor-s-triazine, 2 - m - methoxyphenyl - 4,6-dichlor-s-triazine, and 2-m-methylphenyl-4,6-dichlor-s-triazine. These phenyldichlor-triazines can be reacted with either 3-chloro- or 3-bromo-1-aminoanthraquinone to give the corresponding 2-phenyl - 4,6 - di(3-chloro- or bromoanthraquinonyl-1-amino)-s-triazine from either of which the materials of this invention can be prepared.

The reaction of 2-phenyl-4,6-di(3-bromo- or chloroanthraquinonyl-1-amino)-s-triazines with the alpha-amino-alpha-benzoylaminoanthraquinones proceeds easily by known methods. The two reactants are heated together in a high-boiling organic solvent in the presence of an acid binding agent and a cupriferous reagent until the starting material is no longer detectable. Among the high-boiling solvents which are usable are nitrobenzene, the chlorobenzenes, naphthalene and similar compounds known to the art. The cupriferous reagents which can be used in addition to copper itself are the halides (both cuprous and cupric), the acetates, the oxides, organic copper salts and others known to the art. The acid binding agent may be an organic base or it may be a metallic carbonate or the metallic salt of a weak acid, such as for example, sodium acetate.

The alpha-amino-alpha-benzoylaminoanthraquinones which can be used to react with the 2-phenyl - 4,6 - di(3-chloro- or bromoanthraquinonyl-1-amino)-s-triazines in the performance of this invention are 1-amino-4-benzoylaminoanthraquinone, 1-amino-5-benzoylaminoanthraquinone, and 1-amino-8-benzoylaminoanthraquinone. The benzoyl group may be substituted, for example, by halogen, alkyl or alkoxy groups. The shade which is obtained in the final dyestuff depends to some extent on the position of the benzoylamino group in the aminoanthraquinone. The shades so obtained vary from reddish to bluish brown.

It is believed that the alpha beta polyanthrimides may be converted to carbazoles by elimination of two hydrogen atoms and formation of a new C—C bond under the influence of acidic ring closing agents such as concentrated sulfuric acid, aluminum chloride or titanium tetrachloride. Although experimental proof of this ring closure is not available, it appears to occur even at room temperature in sulfuric acid solution. We are, therefore, not certain whether the product isolated from sulfuric acid is the anthrimide or the carbazole. The color change noted upon solution in sulfuric acid seems to indicate, however, that at least a portion of the anthrimide may be converted to the carbazole and we believe that the product isolated from sulfuric acid is a mixture of the dianthrimide and carbazole compounds.

Our invention may be illustrated by the following examples in which the parts are by weight.

*Example 1*

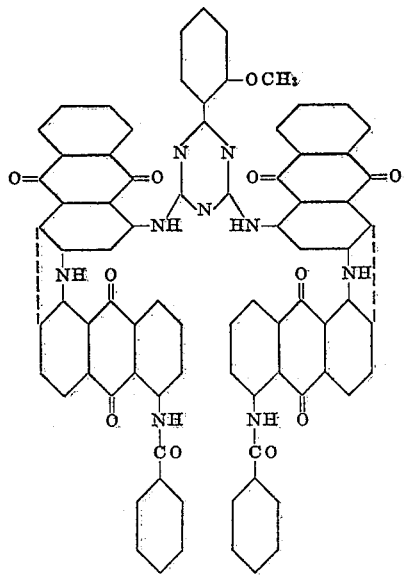

A mixture of 10.3 parts of 2-(o-methoxyphenyl)-4,6-dichloro-s-triazine and 24.2 parts of 1-amino-3-bromoanthraquinone in 300 parts of o-dichlorobenzene was heated and stirred at 140° C. until condensation was complete, during which time the slurry became quite thick. The product was cooled to room temperature, filtered, and washed with o-dichlorobenzene followed by alcohol. The yield of 2-(o-methoxyphenyl)-4,6-bis-(3 - bromoanthraquinonyl-1-amino) - s - triazine was excellent.

A mixture of 7.6 parts of 2-(o-methoxyphenyl)-4,6-bis-(3 - bromoanthraquinonyl-1-amino)-s-triazine; 6.9 parts of 1-amino-5-benzoylamino-anthraquinone; 4.3 parts of sodium carbonate, 0.3 part of cuprous bromide and 120 parts of nitrobenzene was stirred for 16 hours at 200-205° C. The product precipitated from the reaction mixture when the latter was cooled. It was isolated by filtration and washing with nitrobenzene and alcohol. The copper salts were removed by digestion in dilute hydrochloric acid, and the product was finally isolated by filtration and washing. The dyestuff thus obtained is a rust brown powder dissolving in concentrated sulfuric acid with with an olive-brown color and dyeing cellulose fibers from a red-brown vat, fast red-brown shades. A sulfuric acid solution of this dyestuff on standing at room temperature changes color to an orange. The dyestuff when reisolated by drowning and filtering was found to be a much yellower shade, probably due to ring closure to a carbazole. In the formula above, the possible existence of a carbazole ring is indicated by the dotted line.

If, instead of 2-(o-methoxyphenyl)-4,6-bis-(3 - bromoanthraquinonylamino)-s-triazine, the 2-phenyl - 4,6 - bis(3-bromoanthraquinonylamino)-s-triazine is used, the dyestuff obtained has a similar shade.

*Example 2*

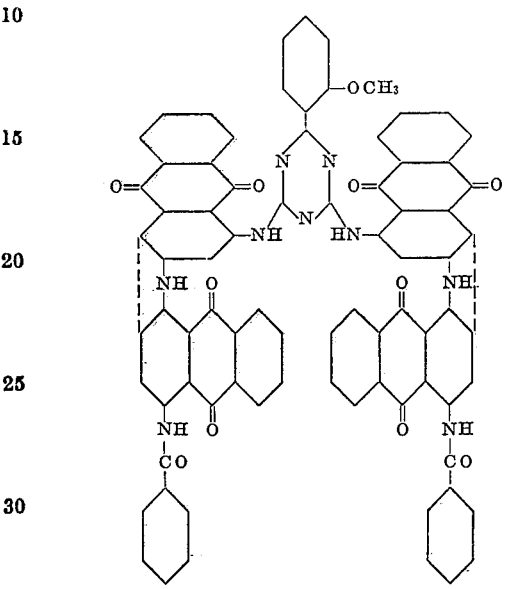

One hundred parts of naphthalene was melted and thereto was added 11.4 parts of 2-(o-methoxyphenyl) - 4,6 - bis(3-bromoanthraquinonyl-1-amino) symmetrical triazine; 4.3 parts of 1-amino-4-benzoylamino-anthraquinone; 5.0 parts sodium carbonate; 3.0 parts of sodium acetate anhydrous and 0.5 part of cuprous bromide. The mass was stirred at 205-207° C. for 16 hours. It was then cooled to about 100° C., diluted with 100 parts by volume of chlorbenzene. The diluted mixture was then filtered at about 80° C. and the product was washed with chlorbenzene and alcohol. The product was finally freed of copper salt by digestion in dilute hydrochloric acid. The dyestuff thus obtained was a dark brown solid, dissolving in concentrated sulfuric acid with a bright green color and dyeing cellulose fibers from a red-brown vat, a fast bluish-brown shade. A similar shade is obtained if 1-amino-4(p-chlorbenzoylamino)anthraquinone is used in place of 1-amino-4-benzoylaminoanthraquinone.

*Example 3*

One hundred parts of naphthalene was melted at about 100° C., and thereto was introduced 6.9 parts of 2-(o-methoxyphenyl)-4,6-bis(3-chloro-anthraquinonyl-1-amino) symmetrical triazine; 6.9 parts of 1-amino-4-benzoylaminoanthraquinone; 5.0 parts of anhydrous sodium carbonate; 2.0 parts of anhydrous sodium acetate and 0.5 part of cuprous bromide. The mixture was stirred at 200-205° C. for 18 hours. After cooling to 150° C., it was diluted with 117 parts of chlorbenzene. The diluted mass was filtered at 70-80° C. and the product was washed with chlorbenzene and alcohol. The dyestuff was freed from copper salt by digestion in hydrochloric acid. The product thus obtained was a brown powder dissolving in concentrated sulfuric acid with a green color and dyeing cellulose fibers from a red-brown vat, a fast bluish-brown shade. It was identical with the product obtained in Example 2 from the corresponding (3-bromoanthraquinonyl-1-amino)-s-triazine.

Example 4

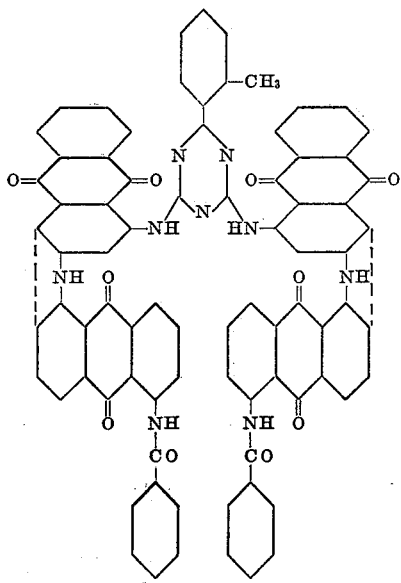

A mixture of 6.2 parts of 2(o-tolyl)-4,6-di(3-bromoanthraquinonyl-1-amino)-s-triazine; 5.5 parts of 1-amino-5-benzoylaminoanthraquinone; 3.0 parts of soda ash; 0.3 part of cupric acetate; 0.1 part of copper powder and 90 parts of nitrobenzene was agitated at 190-200° C. until the reaction was complete. The mixture was cooled to 50° C. and the product isolated by filtration and washing with nitrobenzene and alcohol. Inorganic impurities were removed by slurring the cake in dilute hydrochloric acid and refiltering and rewashing. The product was a brown solid, soluble in sulfuric acid with an orange coloration dyeing cellulose fibers from a brown-red vat, a fast red-brown shade. On standing in concentrated sulfuric acid, the color of its solution changed from orange to olive-brown.

Example 5

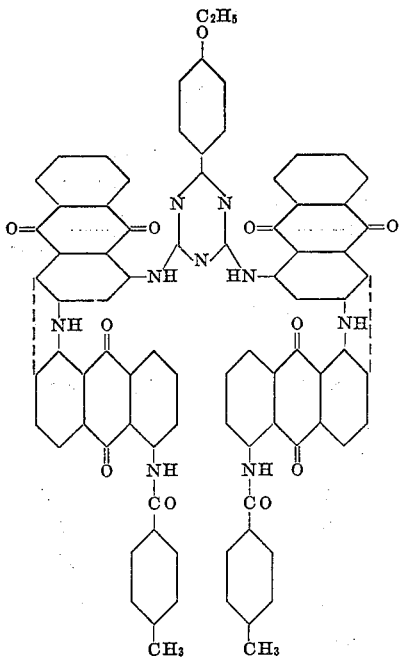

A mixture of 13 parts of 2(p-ethoxyphenyl)-4,6-di(3-bromoanthraquinonyl-1-amino)-s-triazine; 11.1 parts of 1-amino-5-p-toluylaminoanthraquinone; 6 parts of soda ash; 0.6 part of cupric acetate; 0.2 part of copper powder and 180 parts of nitrobenzene was agitated at 190-200° C. until the reaction was complete. The mixture was cooled to 50° C. and the product was isolated by filtration and washing with nitrobenzene and alcohol. Inorganic impurities were removed by slurrying the cake in dilute hydrochloric acid and refiltering and rewashing. The product was a brown solid soluble in sulfuric acid with a yellow coloration, dyeing cellulose fibers from a brown-red vat to a fast red-brown shade. Similar shades were obtained when 1-amino-5-o-toluylaminoanthraquinone or 1-amino-5-(2,5-dimethylbenzoylamino)anthraquinone was used in place of 1-amino-5-p-toluylaminoanthraquinone.

Example 6

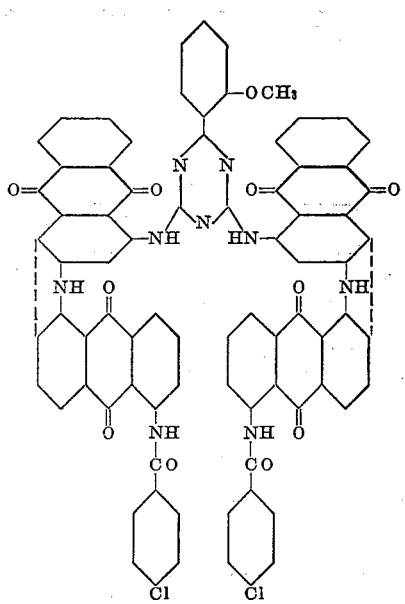

A mixture of 10.3 parts of 2-(o-methoxyphenyl)-4,6-dichloro-s-triazine and 24.2 parts of 1-amino-3-bromoanthraquinone in 300 parts of o-dichlorobenzene is heated and stirred at 140° C. until condensation is complete, during which time the slurry becomes quite thick. The product is cooled to room temperature, filtered, and washed with o-dichlorobenzene followed by alcohol.

A mixture of 7.6 parts of 2-(o-methoxyphenyl)-4,6-bis-(3-bromoanthraquinonyl-1-amino)-s-triazine; 6.3 parts of 1-amino-5-(4-chlorobenzoylamino)-anthraquinone; 4.3 parts of sodium carbonate, 0.3 part of cuprous bromide and 120 parts of nitrobenzene are stirred for 16 hours at 200-205° C. The product precipitates from the reaction mixture when the latter is cooled. It is isolated by filtration and washing with nitrobenzene and alcohol. The copper salts are removed by digestion in dilute hydrochloric acid, and the final product may be isolated by filtration and washing.

We claim:
1. Compounds selected from the group consisting of triazine bis-dianthrimides having the formula:

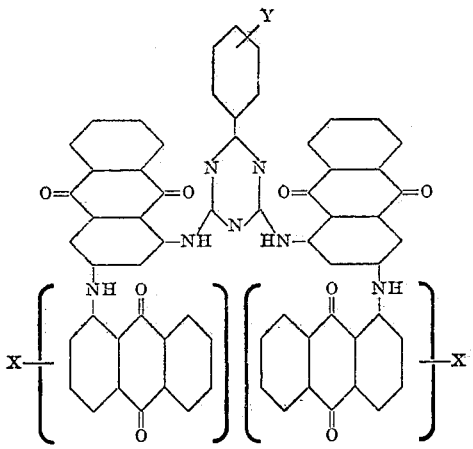

and triazine bis-dianthrimidecarbazoles having the formula:

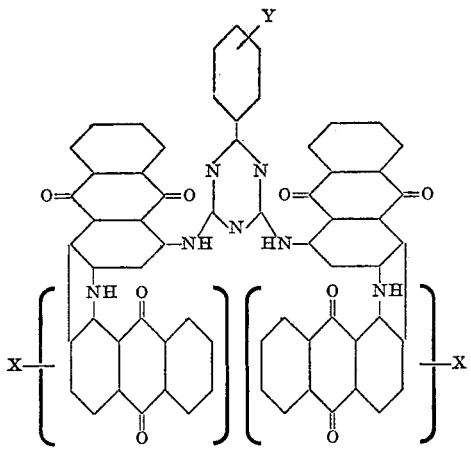

in which formulae Y is a radical containing not more than two carbon atoms selected from the group consisting of alkoxy and alkyl radicals and X is an α-benzoyl amino radical.

2. A method of preparing compounds selected from the group consisting of triazine bis-dianthrimides having the formula:

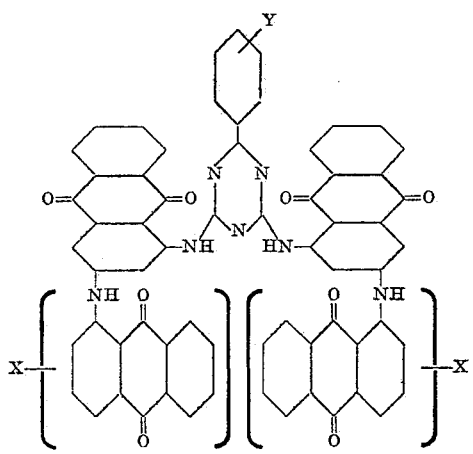

and triazine bis-dianthrimidecarbazoles having the formula:

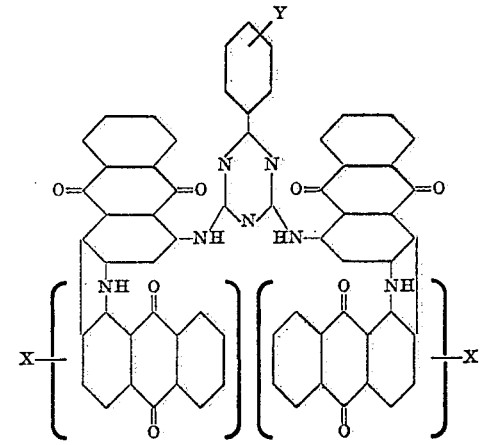

in which formulae Y is a radical containing not more than two carbon atoms selected from the group consisting of alkoxy and alkyl radicals and X is an α-benzoyl amino radical; which comprises reacting a compound having the formula:

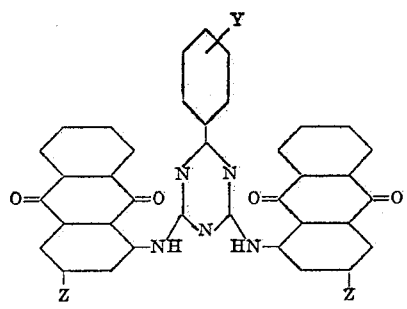

in which Z is a halogen with an alpha-amino, alpha-benzoyl amino anthraquinone.

3. A compound having the formula:

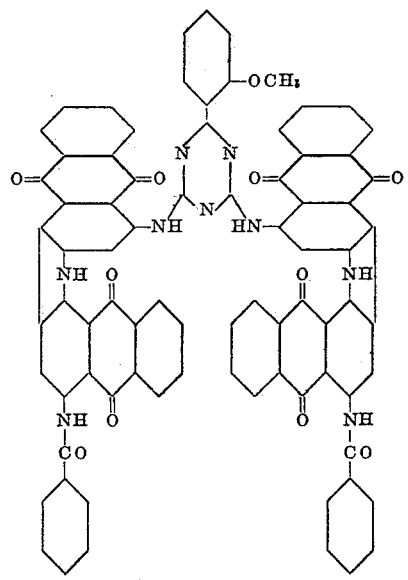

4. A compound having the formula:

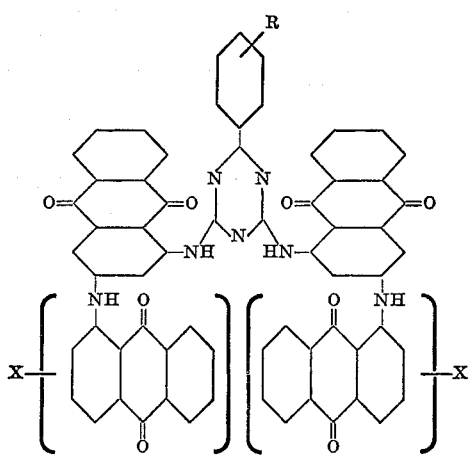

in which formula R is an alkyl radical containing not more than two carbon atoms and X is an α-benzoyl amino radical.

5. A compound having the formula:

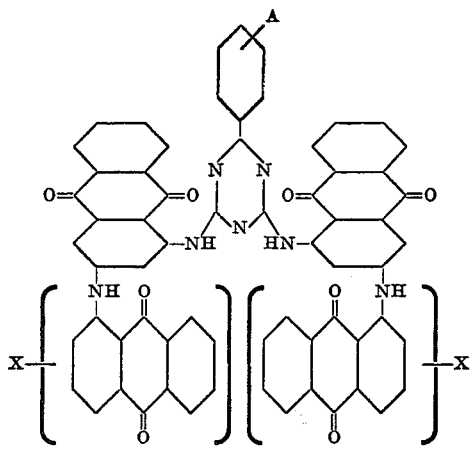

in which formula A is an alkoxy radical containing not more than two carbon atoms and X is an α-benzoyl amino radical.

6. A compound having the formula:

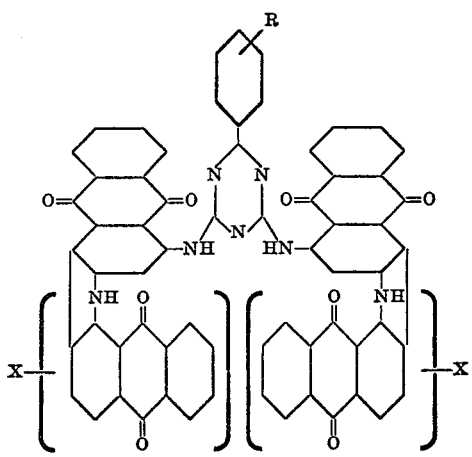

in which formula R is an alkyl radical containing not more than two carbon atoms and X is an α-benzoyl amino radical.

7. A compound having the formula:

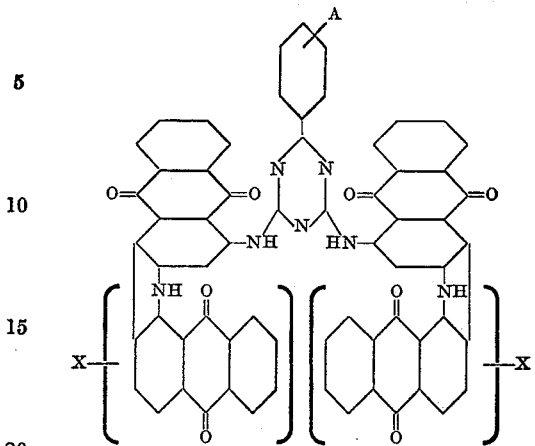

in which formula A is an alkoxy radical containing not more than two carbon atoms and X is an α-benzoyl amino radical.

8. A compound having the formula:

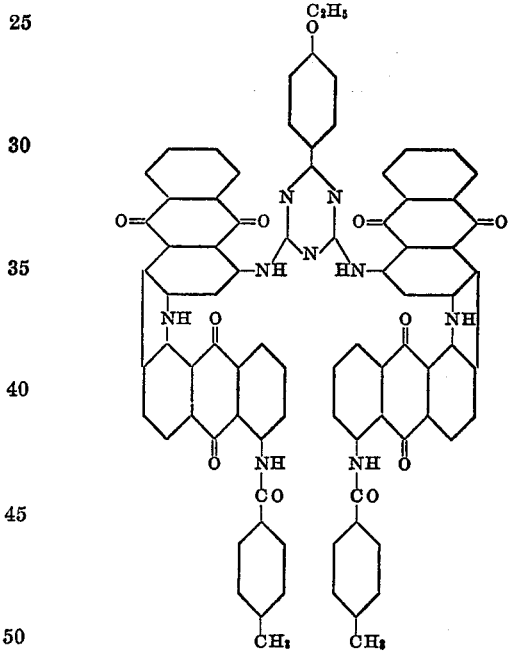

9. A compound having the formula:

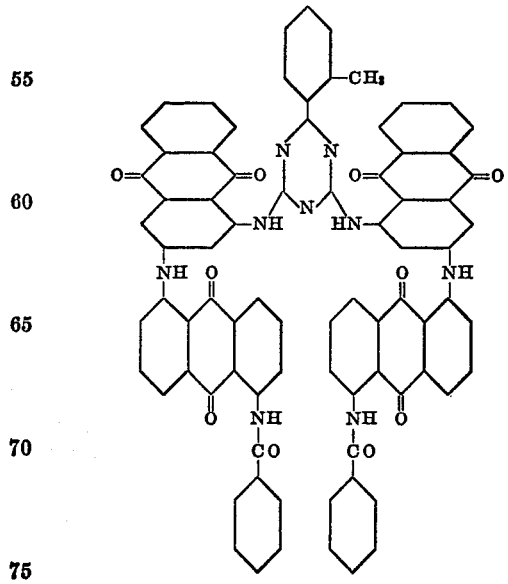

10. A compound having the formula:
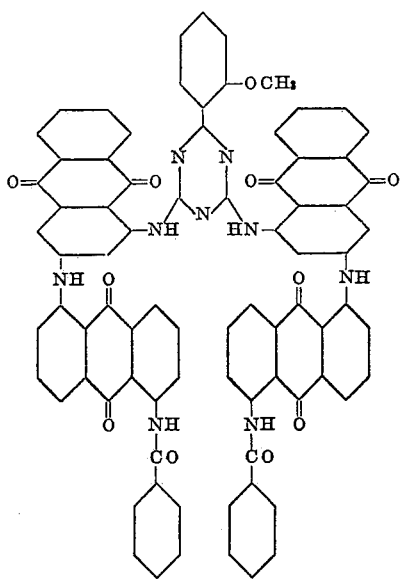
WILLIAM BAPTIST HARDY.
ASA WILLARD JOYCE.
References Cited in the file of this patent
UNITED STATES PATENTS
| Number | Name | Date |
|---|---|---|
| 1,437,783 | Steinbuch | Dec. 5, 1922 |
| 1,888,631 | Kunz | Nov. 22, 1932 |
| 1,944,602 | Weiners | Mar. 19, 1935 |
FOREIGN PATENTS
| Number | Country | Date |
|---|---|---|
| 449,477 | Great Britain | 1936 |
| 796,539 | France | 1935 |